(12) United States Patent
Seto

(10) Patent No.: US 11,769,168 B2
(45) Date of Patent: Sep. 26, 2023

(54) LOYALTY SCHEME FOR INCREMENTAL DISCOUNTS IN THE SERVICE INDUSTRY

(71) Applicant: Tony Seto, New York, NY (US)

(72) Inventor: Tony Seto, New York, NY (US)

( * ) Notice: Subject to any disclaimer, the term of this patent is extended or adjusted under 35 U.S.C. 154(b) by 0 days.

(21) Appl. No.: 17/685,497

(22) Filed: Mar. 3, 2022

(65) Prior Publication Data

US 2022/0284464 A1    Sep. 8, 2022

Related U.S. Application Data

(60) Provisional application No. 63/155,991, filed on Mar. 3, 2021.

(51) Int. Cl.
  *G06Q 30/02* (2023.01)
  *G06Q 30/0226* (2023.01)
  *G06Q 30/0207* (2023.01)

(52) U.S. Cl.
  CPC ..... *G06Q 30/0226* (2013.01); *G06Q 30/0236* (2013.01)

(58) Field of Classification Search
  CPC .............. G06Q 30/02; G06Q 30/0226; G06Q 30/0236; G06Q 30/0254; G06Q 10/067; G06Q 30/0246; G06Q 30/0207
  See application file for complete search history.

(56) References Cited

U.S. PATENT DOCUMENTS 7,318,041 B2 * 1/2008 Walker ............... G06Q 30/0236
                                                            705/14.27
2005/0055272 A1 * 3/2005 Ryan .................... G06Q 20/10
                                                            705/14.27
2012/0084129 A1 * 4/2012 Golden ............. G06Q 30/0222
                                                            705/14.23

(Continued)

FOREIGN PATENT DOCUMENTS

WO    WO 1999/50733 A2 * 10/1999 ............. G06Q 20/10
WO    WO 1999/050733 A2 * 10/1999 ............. G06Q 20/10

(Continued)

OTHER PUBLICATIONS

Byers, John W.; Mitzenmacher, Michael; Zervas, Georgios, The Groupon Effect on Yelp Ratings: A Root Cause Analysis (English), Feb. 10, 2012 (Year: 2012).*

(Continued)

*Primary Examiner* — Marilyn G Macasiano
(74) *Attorney, Agent, or Firm* — Barry Choobin; Patent 360

(57) ABSTRACT

A method to calculate discounts based on a quantity of visits to a business during a time period is described. A request is received from a first user identified as a customer for a service to be performed at the business during a first time period. If the first time period is within a predetermined time period, a quantity of visits of the customer to the business during the predetermined time period is identified, a first discount is generated based on a first quantity of visits of the customer to the business during the predetermined time period, and a second discount is generated based on a second quantity of visits of the customer to the business during the predetermined time period. The first quantity of visits is greater than the second quantity of visits and the first discount is greater than the second discount.

12 Claims, 5 Drawing Sheets

(56) References Cited

U.S. PATENT DOCUMENTS

2015/0025954 A1\* 1/2015 Quinlan ............... G06Q 30/02
705/14.26

FOREIGN PATENT DOCUMENTS

| WO | WO 2002/056530 A2 \* | 7/2002 | ............. H04L 12/26 |
| WO | WO 2011/146054 A1 \* | 11/2011 | ............. G06Q 30/02 |
| WO | WO 2016/122155 A1 \* | 8/2016 | ............. G06Q 30/02 |
| WO | WO 2018/085604 A1 \* | 5/2018 | ............. G06Q 30/00 |

OTHER PUBLICATIONS

Sanchez-Silos, J.J.; Velasco-Arjona, F.J.; Ruiz, I.L.;Gomez-Nieto, M.A., An NFC-Based Solution for Discount and Loyalty Mobile Coupons (English), 2012 4th International Workshop on Near Field Communication (pp. 45-50), Mar. 1, 2012 (Year: 2012).\*

Borrego-Jaraba, F.; Garrido P.C.;Garcia, G.C.; Ruiz. I.L.; Gomez-Nieto, M.A., A Ubiquitous NFC Solution for the Development of Tailored Marketing Strategies Based on Discount Vouchers ans Loyalty Cards (English), Sensors (Basel, Switzerland, 16(5), 6334-6354, May 14, 2013 (Year: 2013).\*

\* cited by examiner

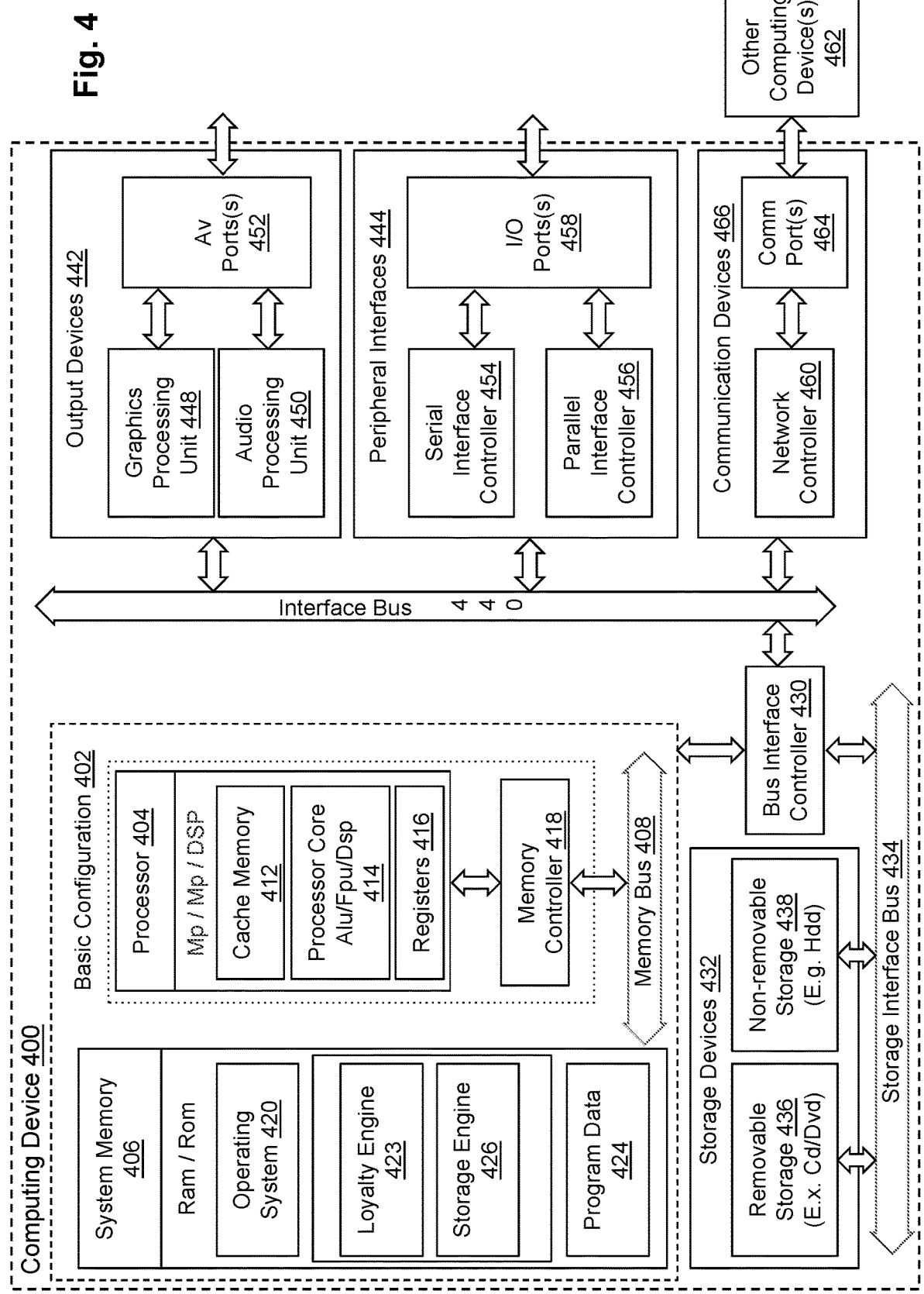

LOYALTY SCHEME FOR INCREMENTAL DISCOUNTS IN THE SERVICE INDUSTRY

CROSS-REFERENCE TO RELATED APPLICATIONS SECTION

This Application is a U.S. Non-Provisional Patent Application that claims priority to U.S. Provisional Patent Application Ser. No. 62/984,637 filed on Mar. 3, 2020 and U.S. Provisional Patent Application Ser. No. 63/155,991 filed on Mar. 3, 2021, the entire contents of which are hereby incorporated by reference in their entirety.

FIELD OF THE EMBODIMENTS

The field of the invention and its embodiments relate to a method executed by a loyalty engine on a computing device for calculating discounts for a user based on a quantity of visits to a business during a predetermined time period. In particular, the present invention and its embodiments provide a method executed by a loyalty engine on a computing device for calculating incremental discounts for a user based on a quantity of visits to a service business including a hair salon and/or a barber shop during a predetermined time period.

BACKGROUND OF THE EMBODIMENTS

Business establishments compete with one another to attract and keep customers. The necessity of having to compete with one another has led to the development of various loyalty and incentive schemes that reward a customer for frequently patronizing and purchasing items in a particular business establishment. These incentive programs are formal schemes used to promote or encourage specific actions or behaviors by a specific group of people during a defined period of time. Incentive programs not only motivate employees to push sales forward, but function to attract and retain customers.

Incentive programs may offer numerous forms of motivation, including points programs where participants collect and redeem points for rewards, monetary discount programs providing participants with discounts on current or future purchases, and non-monetary incentive programs, where participants receive free or discounted airline tickets, hotel stays, and/or food, among other items.

Some incentive programs may also only be valid during or associated with a holiday shopping season, such as Christmas. These incentive programs typically increase customer purchases for the merchant during the associated holiday shopping season. However, the number of participating customers in the incentive program (and/or the increase in customer purchases by virtue of the incentive program) may be less than satisfactory to a merchant. Further, merchants may also desire to increase customer purchases during non-holiday or on-peak times of the year.

Thus, a need exists for a loyalty scheme that provides discounts for a customer based on a quantity of visits to a business during a predetermined time period, where the customer is encouraged to patronize a business establishment multiple times during the predetermined time period, regardless if the predetermined time period is a holiday season.

REVIEW OF RELATED TECHNOLOGY

U.S. Pat. No. 6,460,019 B1 describes a system and method for rewarding a customer's loyalty to a business establishment and encouraging regular customer visits by offering a progressive discount on their purchases. The business establishment includes any entity that allows customers to purchase products. The value of the discount is dependent upon the customer visiting the retail establishment on a regular basis. A customer's visits are tracked, and the customer is provided with a discount that is incremented by a pre-defined value if the customer visits at least once every pre-defined period. The discount may only be incremented once in every pre-defined time period and may be negated if the customer did not visit at all during the pre-defined time period.

WO 2018/085604 A1 describes a method, system, and computer program product for administering a discount rewards program to customers of a merchant establishment. Examples of the merchant establishment include: a retail outlet, a hair salon, a dental clinic, a Spa and massage treatment center, etc. A customer is assigned a discount level as part of enrollment into the discount rewards program and a bill amount is discounted based on the assigned discount level. For a next purchase transaction at the merchant establishment, it is determined whether the next purchase transaction is within a predefined time interval from the purchase transaction associated with the customer enrollment. A current discount level is determined by incrementing or decrementing the discount level based on the determination of whether the next purchase transaction is within the predefined time interval or not. A bill amount is discounted based on the current discount level and the discounted bill amount is provided to the customer to reward the customer.

U.S. Published Patent Application No. 2011/0153397 A1 describes a system for awarding an incentive to a customer at a merchant store. The merchant store may include: retail stores, chain stores, discount stores, department stores, food stores, and other entities that sell their own and/or third party products and/or services via brick-and-mortar stores. An incentive program may be tailored to suit the needs of the merchant store. The incentive program may be provided to a customer to reward specific customer behavior, such as regularly visiting a brick-and-mortar store to purchase store credit and/or to spend store credit and/or rewards, thereby providing the opportunity for increased sales for the merchant.

U.S. Published Patent Application No. 2004/0249703 A1 describes a method and system for inducing potential customers to frequently patronize a business establishment. In accordance with the invention, customers who frequently patronize the establishment are invited to join a club of frequent customers. A member in the club is entitled to a discount on purchases made during a present time period (e.g. the present calendar month) in excess of a first predetermined threshold amount provided that the customer purchased goods or services in an amount that exceeded the first threshold amount during a recent time period (e.g. the calendar month that preceded the present calendar month) and purchased goods or services in an amount that exceeded a third threshold value during a time period that proceeded the recent period (e.g. the calendar month that preceded the recent calendar month). This discount is referred to herein as the member's "self-discount". Thus, for example, a member may receive a self-discount of 4% on the value of his purchases during the present calendar month in excess of the first threshold value, provided he purchased in an amount that exceeded the first threshold value during the previous calendar month. The term "time period" is used in a broad sense and includes a single time span, or two or more discrete time spans. In an example, a member of the club is further rewarded for convincing other individuals to patronize the establishment and to become members of the club of frequent customers.

U.S. Pat. No. 6,332,126 B1 describes a method for implementing a targeted payment system discount program on a computer or computing device. The method includes the following process steps: (a) receiving and storing consumer information concerning participating consumers supplied by one or more payment systems institutions each of which supplies payment means to a subset of the participating consumers; (b) receiving and storing information on merchant discount offers from at least one merchant or acquirer that includes discount information, transaction requirements, and consumer target criteria; (c) identifying qualifying consumers for a merchant discount offer by matching the consumer target criteria for the merchant discount offer with the consumer information concerning participating consumers; (d) comparing consumer transactions of qualifying consumers with the transaction requirements of the merchant discount offer; and (e) returning a calculated discount to qualifying consumers who meet the transaction requirements of the merchant discount offer via a payment systems institution.

U.S. Published Patent Application No. 2010/0174589 A1 describes a system for supporting allocation, to a customer, of reward points redeemable for an article or a service. The system includes: (a) a reward point data obtaining portion that obtains reward point data indicating an amount of reward points of reward programs in which the customer participates; (b) a calculator that calculates, for each of the reward programs, an amount of soon-to-be-lost-reward points, which is an amount of reward points to be lost during a predetermined period among the reward points based on the reward point data obtained by the reward point data obtaining portion; and (c) a display that displays, based on a result of calculation, a screen for indicating, among the reward programs, a reward program having the soon-to-be-lost-reward points whose amount is equal to or more than a predetermined value.

U.S. Published Patent Application No. 2014/0180803 A1 describes a business process model for online group buying that offers discounts based on a time of a visit. This reference enables businesses to incentivize customers to visit the store in off-peak hours. If patrons visit the business during off-peak hours, the patrons receive a maximum amount of discount. If the patrons visit the business during peak hours, the patrons receive a minimum amount of discount. The off-peak hours, the peak hours, and the discount values are defined by the business.

U.S. Pat. No. 10,354,311 B2 describes a method executed by a computer system for determining preferences of an ensemble of items. In various embodiments, progressive discounting of ensembles may be employed. For example, a retailer may employ a pricing scheme where if a user purchases three items in an ensemble, then a discount (e.g., 10% off) is provided for additional purchased items in the ensemble. This results in pricing fairness, where the net price of an ensemble may be aligned with transaction economics.

Various loyalty schemes or methods exist for encouraging a customer to visit a business establishment during a specific time period. However, their means of operation are substantially different from the present disclosure, as the other inventions fail to solve all the problems taught by the present disclosure.

SUMMARY OF THE EMBODIMENTS

The present invention and its embodiments relate to a method executed by a loyalty engine on a computing device for calculating discounts for a user based on a quantity of visits to a business during a predetermined time period. In particular, the present invention and its embodiments provide a method executed by a loyalty engine on a computing device for calculating incremental discounts for a user based on a quantity of visits to a service business including a hair salon and/or a barber shop during a predetermined time period.

A first embodiment of the instant invention describes a method executed by a loyalty engine on a computing device for calculating discounts for a first user based on a quantity of visits to a business during a predetermined time period. The business may be a service business. A non-exhaustive list of service businesses include: a beauty business, a hospitality or a travel business, a business catering to animals, a health and wellness business, an entertainment business, a sporting activity business, an educational business, a facility rental business, and a business one pays admission for.

The method includes receiving login credentials from the first user and identifying the first user and an access level granted to the first user based on the login credentials. In an example, the access level granted to the first user is a customer access level. The method then includes: receiving a request from the first user for a service to be performed at the business during a first time period. Next, the method involves determining if the first time period is within a predetermined time period.

In response to a determination that the first time period is within the predetermined time period, the method includes: identifying the quantity of visits of the first user to the business during the predetermined time period; generating a first discount based on a first quantity of visits of the first user to the business during the predetermined time period; and generating a second discount based on a second quantity of visits of the first user to the business during the predetermined time period. The first quantity of visits is greater than the second quantity of visits.

Moreover, the first discount is greater than the second discount. In some examples, the first and the second discount are both incremental discounts. In additional examples, the first discount and/or the second discount are additionally calculated based on one or more factors. A non-exhaustive list of the one or more factors includes: a popularity of the service during the predetermined time period at the business, a profitability of the business during the predetermined time period, a quantity of customers visiting the business during the predetermined time period, a geographic location of the business, a month of the year, a time during a day during which the service is sold, a popularity of the service at a similar business, a profitability of the similar business during the predetermined time period, and/or a quantity of customers visiting the similar business during the predetermined time period.

Lastly, the method involves displaying the first discount or the second discount to the first user. In some examples, the method may further include receiving payment from the first user for the service performed at the business during the first time period via a cash transaction at the business or via the loyalty engine.

The method may further include: receiving login credentials from a second user and identifying the second user and the access level granted to the second user based on the login credentials. The access level granted to the second user is an administrator access level. Then, the method may include receiving a modification from the second user to a length of the predetermined time period and/or a modification to an amount of the first discount and/or the second discount. In response to receiving this modification, the method may include: modifying the length of the predetermined time period and/or the amount of the first discount and/or the second discount.

A second embodiment of the instant invention describes a method executed by a loyalty application on a computing device for calculating discounts for a first user based on a quantity of visits to a service business during a predetermined time period. A non-exhaustive list of the service business may include: a beauty business, a hospitality or a travel business, a business catering to animals, a health and wellness business, an entertainment business, a sporting activity business, an educational business, a facility rental business, a cleaning business, a repair/home improvement business, and a business one pays admission for.

The method includes receiving login credentials from the first user and identifying the first user and an access level granted to the first user based on the login credentials. The access level granted to the first user is a customer access level. The method may then include: receiving a request from the first user for a service to be performed at the service business during a first time period and determining if the first time period is inside or outside of the predetermined time period.

In response to this determination that the first time period is outside of the predetermined time period, the method may display a non-discounted cost associated with the service to be performed by the service business. In response to a determination that the first time period is inside or within the predetermined time period, the method may include identifying the quantity of visits of the first user to the service business during the predetermined time period, generating a first discount based on a first quantity of visits of the first user to the service business during the predetermined time period, and generating a second discount based on a second quantity of visits of the first user to the service business during the predetermined time period.

The first quantity of visits is greater than the second quantity of visits. The first discount is greater than the second discount. In examples, the first discount and the second discount are incremental discounts. The method may further include displaying the first discount or the second discount to the first user.

The method may additionally include receiving login credentials from the second user and identifying the second user and the access level granted to the second user based on the login credentials. The access level granted to the second user is the employee access level. The method may then include: receiving a notification from the second user that the service is completed and transmitting, in real-time, a text message notification to the computing device of the first user that a payment is due for the completed service or transmitting, in real-time, a notification within the loyalty application for display to the first user that a payment is due for the completed service. The method may further include receiving payment from the first user for the service completed via a cash transaction at the business or via the loyalty application.

A third embodiment of the instant invention describes a computer system. The computer system comprises one or more processors, one or more memories, and one or more computer-readable hardware storage devices. The one or more computer-readable hardware storage devices contain program code executable by the one or more processors via the one or more memories to implement a method for calculating discounts for a first user based on a quantity of visits to a service business (e.g., a hair salon or a barber shop) during a predetermined time period. The method includes receiving login credentials from the first user and identifying the first user and an access level granted to the first user based on the login credentials. The access level granted to the first user is the customer access level.

The method may then include receiving a request from the first user for a service to be performed at the service business during a first time period and determining that the first time period is within a predetermined time period. Next, the method may include: identifying the quantity of visits of the first user to the service business during the predetermined time period, generating a first discount based on a first quantity of visits of the first user to the service business during the predetermined time period, and generating a second discount based on a second quantity of visits of the first user to the service business during the predetermined time period.

It should be appreciated that the first quantity of visits is greater than the second quantity of visits. Further, the first discount is greater than the second discount. Additionally, the first discount and the second discount are incremental discounts. Next, the method may include displaying the first discount or the second discount to the first user.

The method may additionally include receiving login credentials from the second user and identifying the second user and the access level granted to the second user based on the login credentials. The access level granted to the second user is the employee access level. The method may then include: receiving a notification from the second user that the service is completed and transmitting, in real-time, a text message notification to the computing system of the first user or transmitting, in real-time, a notification within the loyalty application for display to the first user that a payment is due for the completed service. The method may then include: receiving payment from the first user for the service completed via a cash transaction at the business or via the loyalty application.

In other examples, the method may further include: receiving login credentials from the second user and identifying the second user and the access level granted to the second user based on the login credentials. The access level granted to the second user is the administrator access level. The method may further include: receiving a modification from the second user to a length of the predetermined time period and/or a modification to an amount of the first discount and/or the second discount. The method may then include modifying the length of the predetermined time period and/or modifying the amount of the first discount and/or the second discount.

In general, the present invention succeeds in conferring the following benefits and objectives.

It is an object of the present invention to provide a loyalty scheme or method that encourages a customer to patronize a business establishment multiple times during the predetermined time period, regardless if the predetermined time period is a holiday or peak season.

It is an object of the present invention to provide a loyalty scheme or method that modifies customer behavior and encourages a customer to patronize a business establishment multiple times during the predetermined time period.

It is an object of the present invention to provide a loyalty scheme or method that encourages a customer to patronize a business establishment multiple times during the predetermined time period by providing incremental discounts to the customer.

It is an object of the present invention to provide a loyalty scheme or method that increases a business's gross profit margins.

It is an object of the present invention to provide a method that allows a business to track both profits and discounts given to customers.

It is an object of the present invention to provide a method for generating and calculating incremental discounts for a customer based on a quantity of visits to a business during a predetermined time period.

It is an object of the present invention to provide a method for generating and calculating incremental discounts for a customer based on a quantity of visits to a hair salon or barber shop during a predetermined time period.

BRIEF DESCRIPTION OF THE DRAWINGS

FIG. 4 is a block diagram of a computing device included within the computer system of FIG. 1 that is configured to calculate discounts for a user based on a quantity of visits to a service business during a predetermined time period, in accordance with embodiments of the present invention.

DESCRIPTION OF THE PREFERRED EMBODIMENTS

Figure 1:
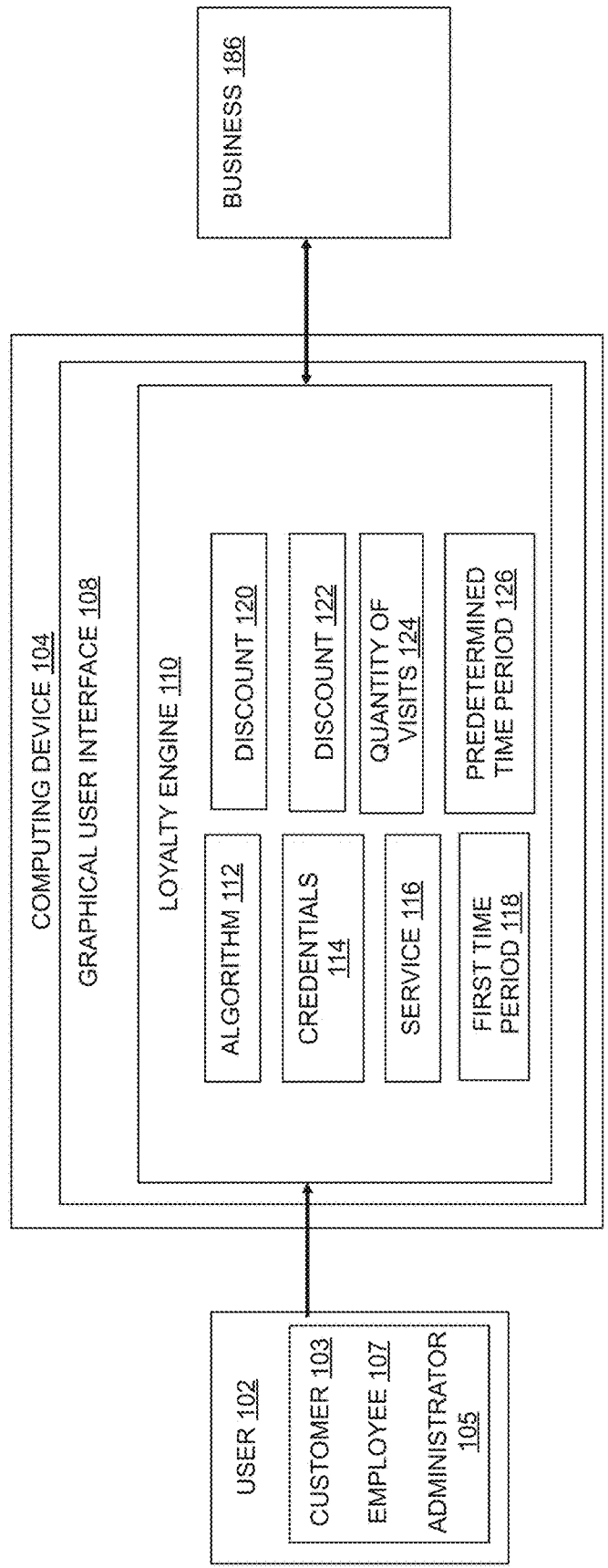
FIG. 1 depicts a perspective view of a computer system configured to implement a method for calculating discounts for a user based on a quantity of visits to a service business during a predetermined time period, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
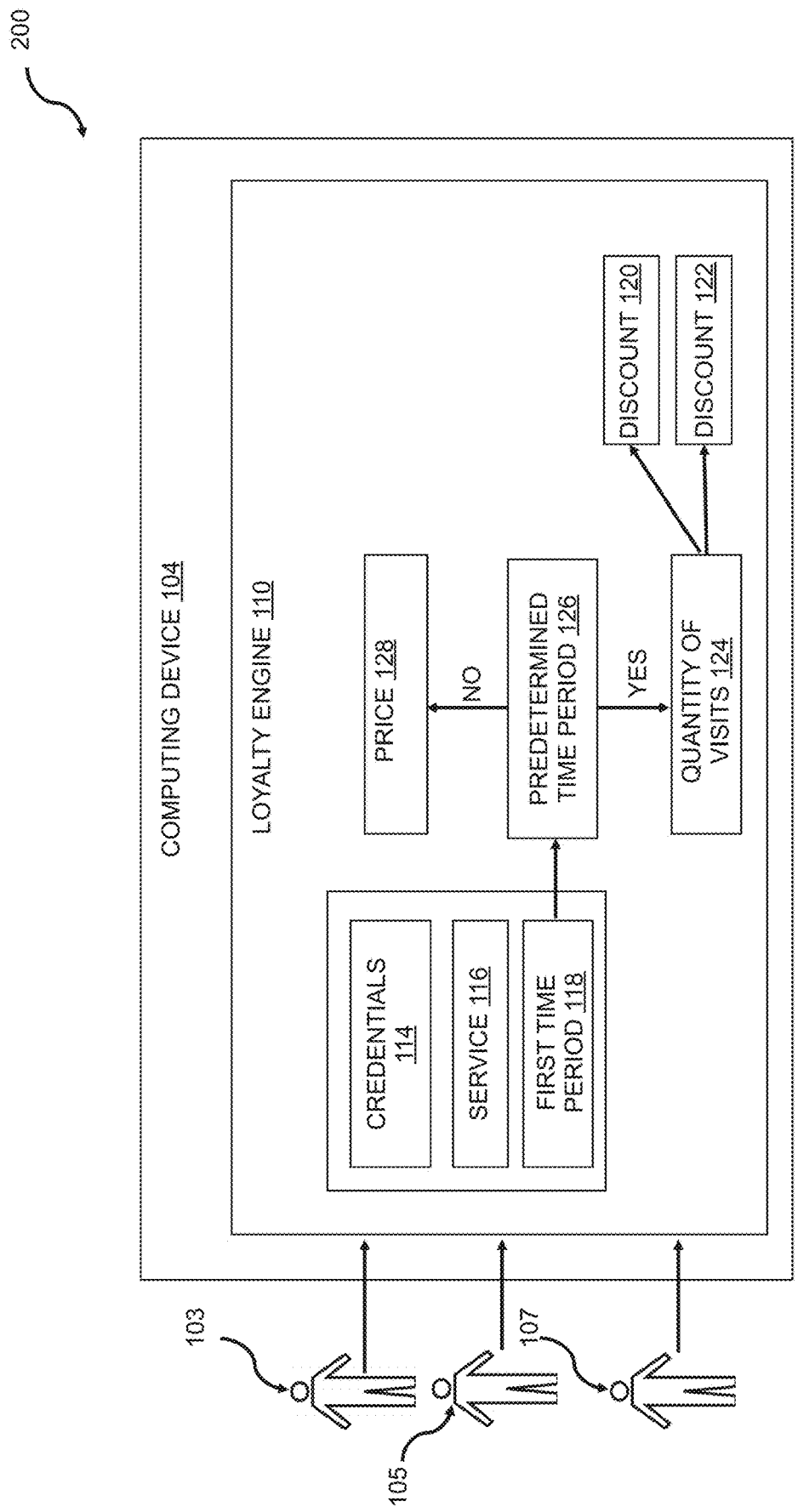
FIG. 2 depicts another perspective view of a computer system configured to implement a method for calculating discounts for a user based on a quantity of visits to a service business during a predetermined time period, in accordance with embodiments of the present invention.

FIG. 1 and FIG. 2 depict perspective views of a computer system configured to implement a method for calculating discounts for a user based on a quantity of visits to a service business during a predetermined time period, in accordance with embodiments of the present invention.

The computer system 100 and the computer system 200 of FIG. 1 and FIG. 2, respectively, includes a computing device 104. The computing device 104 may be a computer, a laptop computer, a smartphone, and/or a tablet, among other examples not explicitly listed herein. The computing device 104 may comprise a loyalty engine 110 that may execute the method for calculating discounts for a user 102 based on a quantity of visits to a business 186 during a predetermined time period 126. It should be appreciated that the discounts are on a product by product basis. In other examples, the loyalty engine 110 may be a loyalty application, a loyalty software program, a loyalty service, or a loyalty software platform configured to be executable on the computing device 104. The user 102 may interact directly with the loyalty engine 110 via a graphical user interface (GUI) 108 of the computing device 104.

The loyalty engine 110 may receive, from the user 102, login credentials 114. The login credentials 114 may include a username, a password, a biometric identification means (e.g., fingerprint identification, face recognition identification, palm print identification, iris recognition, retina recognition, etc.), etc. In response, the loyalty engine 110 may identify the user 102 based on the login credentials 114. Identification of the user 102 may include information, such as: a name of the user 102, a telephone number of the user 102, an address of the user 102, a birthdate of the user 102, types of services purchased by the user 102, an access level granted to the user 102 for the loyalty engine 110, etc.

Examples of the access level granted to the user 102 for the loyalty engine 110 may include a customer access level 103, an administrator access level 105, and/or an employee access level 107. In examples, the administrator access level 105 may be associated with an owner of a business 186. It should be appreciated that more than one user may interact with the loyalty engine 110 at a time. For example, a first user associated with the customer access level 103 may be identified as a customer and a second user associated with the administrator access level 105 may be identified as an administrator. Both the first user and the second user may have their own computing devices (such as the computing device 104) and may interact with the loyalty engine 110 at the same time.

In an example where the access level granted to the user 102 for the loyalty engine 110 is the customer access level 103, the loyalty engine 110 may receive, from the user 102, a request a service 116 to be performed at the business 186 during a first time period 118. In some examples, the business 186 is a service business. The service business may include: a beauty business, a hospitality or a travel business, a business catering to animals, a health and wellness business, an entertainment business, a sporting activity business, an educational business, a facility rental business, a cleaning business, a repair/home improvement business, and a business one pays admission for, among others.

The beauty business may include a hair salon, a body piercing business, a tattoo parlor, a piercing business, a hair removal business, a makeup artistry business, a barber shop, a nail salon, a tanning salon, etc. The hospitality or travel business may include: a food or drink business (such as a restaurant, a bar, an ice cream shop, a dessert shop, a bagel shop, a sandwich shop, a pub, etc.), an airline business, a hotel business, a transportation business (e.g., a helicopter business, a train business, a taxi business, a car share business, a boating business, etc.) and a sight-seeing business, etc.

The business catering to animals may include a pet sitting business, a pooper-scooper business, a pet day care business, a dog obedience training business, a dog walking business, a pet photography business, a pet grooming business, a pet bakery, a veterinary business, etc. The health and wellness business may include: a mental health business (including a psychiatry business, a counseling business, a therapy business, etc.), a hospital, a medical marijuana business, a CBD business, a cannabis business, a skin care business, a clinic, a massage business, a spa, a Botox business, an aromatherapy business, an anti-aging business, a sauna lounge, a fitness business (e.g., a fitness center/gym), a weight loss business, a physical therapy business, a chiropractic business, an acupuncture business, a cupping business, etc.

The entertainment business may offer: film viewing services (such as a movie theater), music performance or production services (such as a concert, a karaoke business, a music production studio, etc.), sports viewing services (such as sports arenas, boxing halls, etc.), attraction services (such as theme parks, a ziplining business, a garden or botanical business, a night club, a virtual reality center, a simulated sky diving business, a go kart business, a paint ball business, an internet café, a video game arcade, an escape room business, an amusement park, an aquarium, a water park, a zoo, etc.), cultural attractions (such as an art museum, a history museum, a science museum, etc.), cultural events (such as a festival, a fair, a parade, etc.), performance art services (such as a play, a musical, a carnival, a dance performance or show, a circus, a comedy show, a magic show, etc.).

The sporting activity business may include: a bowling alley, a billiards hall, a golf course, a mini-golf course, a driving range, a tennis court, a country club offering numerous sporting activities, a rock climbing business, a hiking business, an archery business, an axe throwing business, a gun range, a boating business, a jet ski business, a skiing business, a snowboarding business, a rafting business, an off-roading business, a surfing business, a stand-up paddle board business, etc.

The educational business may offer: a painting class, a self-defense class, a dancing class, a singing class, a musical instrument instruction class, a parenting class, a driving class, a defensive driving class, a target shooting class, a piloting class, a swimming class, a sports class, a language learning class, an academics class, etc. The facility rental business may offer services including: meeting hosting, party hosting, catering hall rentals, office space rentals, etc.

The cleaning business may offer: home cleaning services and/or auto care services (e.g., including detailing and/or vehicle washing services), among others. The repair/home improvement business may offer home appliance repair services, home appliance installation services, painting services, electrical services, carpentry services, plumbing services, and miscellaneous handyman services, among others.

Other miscellaneous service businesses may include businesses that one pays admission for. In further examples, the service business may include: gas stations, vehicle recharging stations (electric or otherwise), florist businesses, gardening businesses, landscaping businesses, baking businesses, wedding planning businesses, and catering businesses. Moreover, in additional examples, the business may be a retail or e-commerce business selling physical, tangible goods of any type. A non-exhaustive list of the physical, tangible goods includes: groceries, clothing, electronics, convenience store products, etc.

In these examples, the user 102 may order a product ahead and may pick up the product from the business 186. It should be appreciated that the list of businesses is provided for illustration purposes only and other businesses, not explicitly listed herein, are contemplated by the instant disclosure.

Next, the loyalty engine 110 may determine if the first time period 118 is within a predetermined time period 126. The predetermined time period 126 may be any time period, such as a year, a month, a week, a day, a number of hours during a day, a holiday season, etc. If the loyalty engine 110 determines that the first time period 118 fails to be within the predetermined time period 126 (e.g., depicted as "NO" in FIG. 2), the loyalty engine 110 may display a non-discounted price 128 associated with the service 116.

As an illustrative example, the predetermined time period 126 may thirty days around the Christmas season. The predetermined time period 126 starts with the first purchase (defined as the first time period 118) by the user 102 at the business 186 and then extends for the thirty days. For example, the first visit of the user 102 to the business 186 may be made on December 25. Since the loyalty engine 110 determines that this first visit is within the defined thirty days (e.g., depicted as "YES" in FIG. 2), the loyalty engine 110 may identify the quantity of visits 124 of the user 102 to the business 186 during the predetermined time period 126.

In a first example, the loyalty engine 110 may identify the quantity of visits 124 of the user 102 to the business during the predetermined time period 126 (e.g., the thirty days) as being three visits. As such, the loyalty engine 110 may generate a first discount 120 based on a first quantity of visits of the user 102 to the business 186. In a second example, the loyalty engine 110 may identify the quantity of visits 124 of the user 102 to the business during the predetermined time period 126 (e.g., the thirty days) as being one visit. As such, the loyalty engine 110 may generate a second discount 122 based on a second quantity of visits of the user 102 to the business 186.

In examples, the first quantity of visits (e.g., three visits of the user 102 to the business 186 during the thirty days) is greater than the second quantity of visits (e.g., one visit of the user 102 to the business 186 during the thirty days), and as such, the first discount 120 is greater than the second discount 122. It should be appreciated that the first discount 120 and the second discount 122 are each associated with a singular service 116. Therefore, the discounts (e.g., the first discount 120 and the second discount 122) are made on a product by product or a service by service basis.

In other examples, the first quantity of visits is less than the second quantity of visits, and as such, the first discount 120 is less than the second discount 122. In additional examples, the first discount 120 and the second discount 122 are incremental discounts such that the greater number of times the user 102 visits the business 186 during the predetermined time period 126, the greater the discount for the user 102 will be. For example, if the user 102 visits the business 186 once during the predetermined time period 126, the user 102 will receive a first discount. If the user 102 visits the business 186 twice during the predetermined time period 126, the user 102 will receive a second discount. If the user 102 visits the business 186 three times during the predetermined time period 126, the user 102 will receive a third discount. The third discount is greater than the first discount and is also greater than the second discount. The second discount is greater than the first discount.

In some examples, the loyalty engine 110 may additionally calculate the first discount 120 and/or the second discount 122 based on one or more factors. A non-exhaustive list of one or more factors includes: a popularity of the service 116 or a quantity of the sales associated with the service 116 during the predetermined time period 126 (e.g., a greater discount may be associated with an eyebrow wax service as compared to a haircut service if only one eyebrow wax service was sold during the predetermined time period 126, as compared to seven haircut services), a profitability of the business 186 during the predetermined time period 126 (e.g., the business 186 may increase the discount during a non-holiday season and/or during non-peak times of a day), a quantity of customers visiting the business 186 during the predetermined time period 126 (e.g., the business 186 may increase the discount during non-peak weeks or months of the year), a geographic location of the business 186 (e.g., the business 186 may have multiple locations and may increase the discount in the locations having a lower profitability than other locations), a month of the year (e.g., the business 186 may increase the discount during non-peak or non-holiday months out of the year to attract new customers to the business 186), and/or a time during a day during which the service 116 is sold (e.g., the business 186 may increase the discount during the hours of the morning if the service 116, such as a massage, is typically only sold after 5 PM), among other factors not explicitly listed herein.

These one or more factors may also be associated with similar businesses within a geographic location of the business 186 and/or similar businesses that are competitors of the business 186. The one or more factors may include: a popularity of the service 116 at a similar business (e.g., the business 186 may increase the discount if the service 116, such as a facial, is extremely popular at competing businesses), a profitability of the similar business during the predetermined time period 126 (e.g., the business 186 may increase the discount during the predetermined time period 126 if the business 186 identifies that a competing business is popular and has high sales), and/or a quantity of customers visiting the similar business during the predetermined time period 126 (e.g., the business 186 may increase the discount during the predetermined time period 126 in order to attract customers visiting the similar business to the business 186), among other factors not explicitly listed herein.

The loyalty engine 110 may then display the first discount 120 or the second discount 122 to the user 102 through the loyalty engine 110 and via the GUI 108 of the computing device 104. The first discount 120 or the second discount 122 may be displayed using text, graphics, videos, audio, etc.

It should be appreciated that the loyalty engine 110 may utilize an algorithm 112 to perform one or more process steps described in FIG. 1 and FIG. 2 to maximize profits of the business 186. The algorithm 112 may include an artificial intelligence (AI) algorithm or an AI computer vision algorithm, among other algorithms not explicitly listed herein.

In some examples, the loyalty engine 110 is a loyalty application that accepts payments and is customizable for a particular business 186. The customizability allows the business 186 to have the loyalty application (e.g., the loyalty engine 110) directly reflect their brand's look and feel.

Figure 3A:
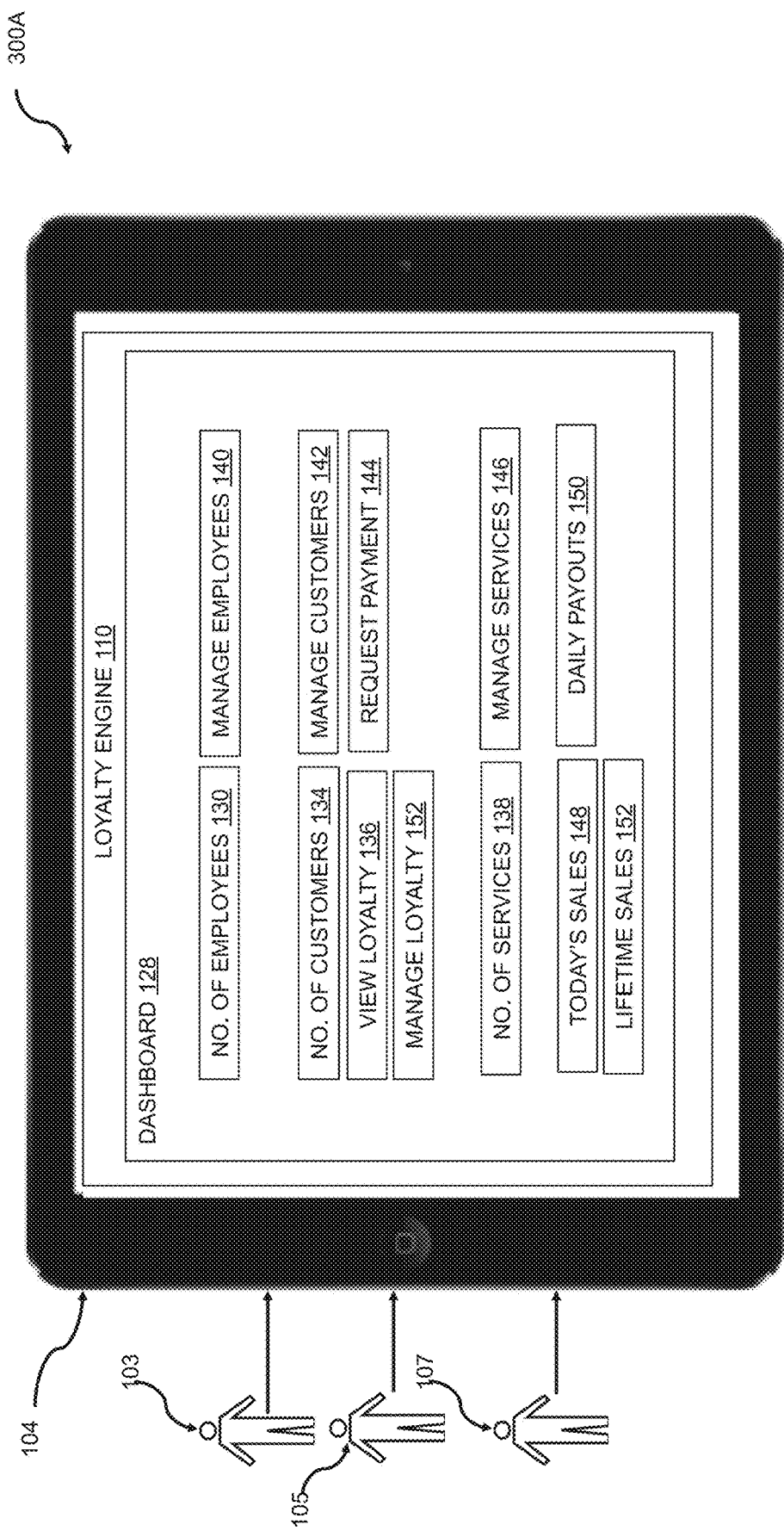
FIG. 3A depicts a perspective view of a dashboard associated with a loyalty engine of a computing device, the loyalty engine being configured to execute a method for calculating discounts for a user based on a quantity of visits to a service business during a predetermined time period, in accordance with embodiments of the present invention.
Figure 3B:
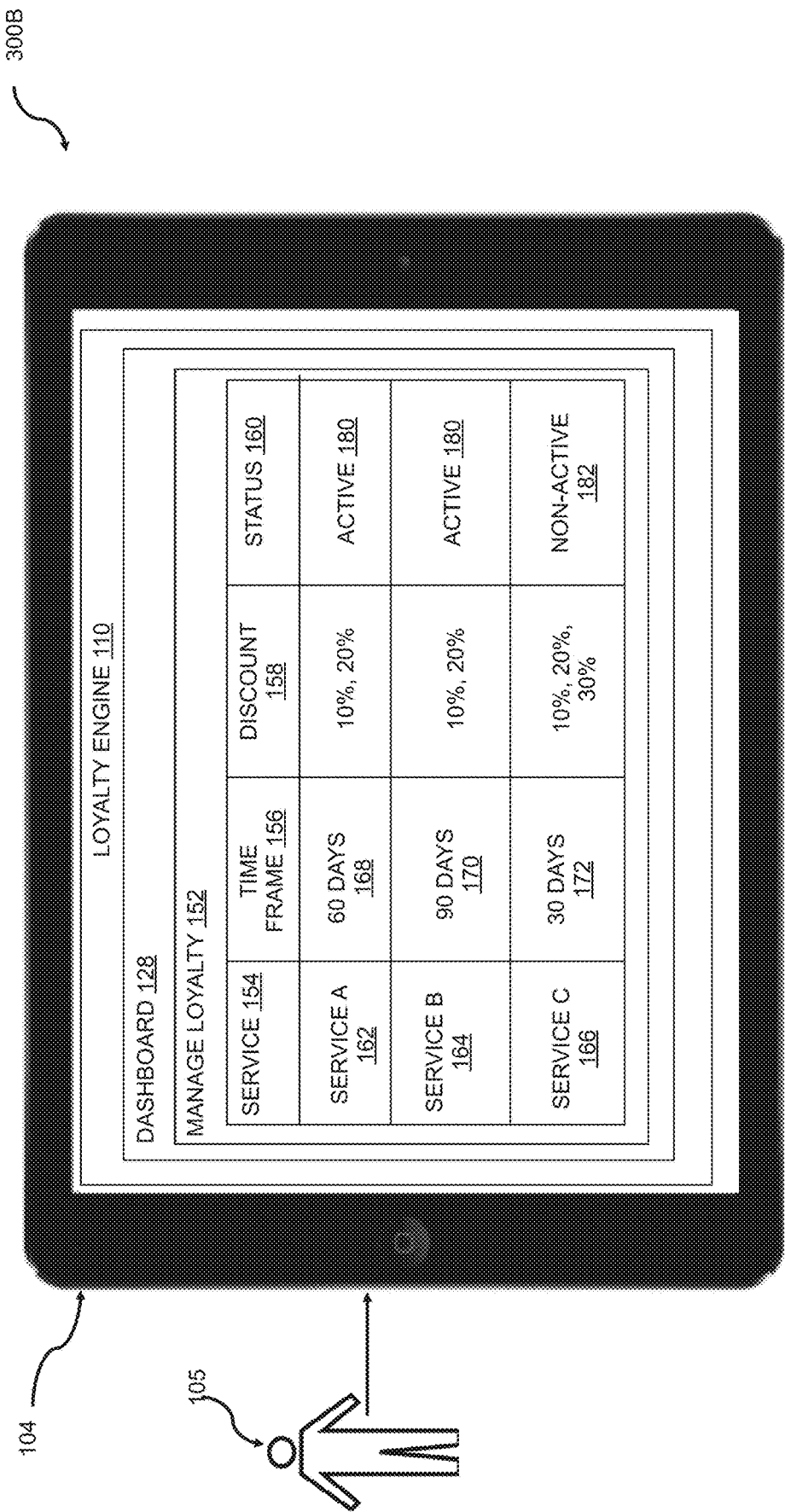
FIG. 3B depicts a perspective view of a loyalty management feature of a dashboard associated with a loyalty engine of a computing device, the loyalty engine being configured to execute a method for calculating discounts for a user based on a quantity of visits to a service business during a predetermined time period, in accordance with embodiments of the present invention.

FIG. 3A depicts a perspective view of a dashboard associated with a loyalty engine of a computing device, the loyalty engine being configured to execute a method for calculating discounts for a user based on a quantity of visits to a service business during a predetermined time period, in accordance with embodiments of the present invention. FIG. 3B depicts a perspective view of a loyalty management feature of a dashboard associated with a loyalty engine of a computing device, the loyalty engine being configured to execute a method for calculating discounts for a user based on a quantity of visits to a service business during a predetermined time period, in accordance with embodiments of the present invention.

The dashboard 128 of FIG. 3A may include numerous components, such as an employee component, a customer component, a service component, and a sales component, among others not explicitly listed herein. The employee component may include a number or quantity of employees section 130 and a feature to manage employees 140. It should be appreciated that the number or quantity of employees section 130 may not only include a precise quantity or number of employees, but may also include identifying information of each employee, such as an employee's name, an employee's address, an employee's telephone number, an employee's work schedule, etc.

The customer component may include a number or quantity of customers section 134, a loyalty section 136, a feature to manage customer loyalty 152 (as depicted in FIG. 3B), a feature to manage the customers 142, and a payment requesting feature 144. The service component may include a number or quantity of services section 138 and a feature to manage the services 146. The sales component may include a section listing the sales for a given day 148, a section listing daily payouts 150, and a section listing lifetime sales 152.

Different versions of the dashboard 128 are accessible based on the identity of the individual seeking access to the dashboard 128 associated with the loyalty engine 110, as described in FIG. 1 and FIG. 2. Moreover, as explained in reference to FIG. 1 and FIG. 2, a first user associated with the customer access level 103 and identified as a customer and a second user associated with the administrator access level 105 and identified as an administrator may both interact with the loyalty engine 110 during a given time period.

For example, the loyalty engine 110 may receive login credentials 114 from the user 102. In response, the loyalty engine 110 may identify the user 102 based on the login credentials 114. Identification of the user 102 may include the access level granted to the user 102 to access the loyalty engine 110. In an example, the access level granted to the user 102 to access the loyalty engine 110 (and subsequently, the dashboard 128) may include the employee access level 107. The user 102 may then view and/or access to the following: the quantity of employees section 130, the quantity of customers section 134, the payment requesting feature 144, and/or the quantity of services section 138.

Moreover, the user 102 associated with the employee access level 107 (e.g., an employee) may, after the service 116 is rendered, request, via the payment requesting feature 144 of the dashboard 128, payment from the user 102 associated with the customer access level 103 (e.g., the customer to whom the service 116 was rendered). The payment request may be transmitted, in real-time, via a text message notification to the computing device 104 associated with customer and/or via a notification within the loyalty engine 110 for display to the customer. The notification may be a textual notification, an audio notification, and/or a graphic notification, etc. The customer may be requested to pay via the loyalty engine 110 or via a cash transaction at the business 186. If the customer wishes to pay via the cash transaction, the customer, may pay an employee at the business 186. Then, once payment is received from the customer, the employee may insert a notification or comment into the dashboard 128 to indicate that the service 116 rendered was paid for.

The feature to manage customer loyalty 152 of the dashboard 128 is depicted in FIG. 3B. The feature to manage customer loyalty 152 may include a services component 154, a time frame component 156, a discount component 158, and a status component 160, among others. As depicted, the feature to manage customer loyalty 152 may include a tabular configuration, but other configurations are contemplated.

The services component 154 may include a listing of various services (e.g., a service A 162, a service B 164, a service C 166, etc.), as well as descriptions of the various services at the business 186. The service A 162, the service B 164, the service C 166 may include: a haircut, a blow dry, a wax, a manicure, a pedicure, a facial, a pet grooming session, a massage, an exfoliation treatment, a hair coloring, etc. The time frame component 156 may include various predetermined time frames associated with discounts for the various services of the services component 154. For example, the predetermined time frame of 60 days 168 is associated with the service A 162, such that the 60 days 168 begins with the first purchase of the service A 162 by the user 102. In another example, the predetermined time frame of 90 days 170 is associated with the service B 164, such that the 90 days 170 begins with the first purchase of the service B 164 by the user 102. As another example, the predetermined time frame of 30 days 172 is associated with the service C 166, such that the 30 days 172 begins with the first purchase of the service C 166 by the user 102.

The discount component 158 may include the first discount 120 and/or the second discount 122 for the various services of the services component 154. As a first illustrative example, the service A 162 is a pedicure, the time frame 156 associated with the service A 162 is a first time frame 168 of 60 days, and the status 160 of the discounts are in active status 180 (indicating that the discounts are currently running). If the user associated with the customer access level 103 visits the business 186 once during the first time frame 168, the user will receive a 10% discount on the pedicure. If the user associated with the customer access level 103 visits the business 186 twice during the first time frame 168, the user will receive an incrementally higher 20% discount on the pedicure.

As a second illustrative example, the service B 164 is an eyebrow wax, the time frame 156 associated with the service B 164 is a second time frame 170 defined as 90 days, and the status 160 of the discounts are in the active status 180. If the user associated with the customer access level 103 visits the business 186 once during the second time frame 170, the user will receive a 10% discount on the eyebrow wax. If the user associated with the customer access level 103 visits the business 186 twice during the second time frame 170, the user will receive an incrementally higher 20% discount on the eyebrow wax.

As a third illustrative example, the service C 166 is a pet grooming appointment, the time frame 156 associated with the service C 166 is a third time frame 172 defined as 30 days, and the status 160 of the discounts are in the non-active status 182 (indicating that this discount is currently not running). As such, regardless of the number of times the user 102 associated with the access level 103 visits the business 186 visits the business 186 during the third time frame 172, the user 102 will pay the non-discounted price 128 associated with the service C 166.

In another example, the loyalty engine 110 may receive login credentials 114 from the user 102. In response, the loyalty engine 110 may identify the user 102 based on the login credentials 114. Identification of the user 102 may include the access level granted to the user 102 to access the loyalty engine 110. In an example, the access level granted to the user 102 to access the loyalty engine 110 (and subsequently, the dashboard 128) may include the administrator access level 105. The user 102 associated with the administrator access level 105 may have access to all components and features of the loyalty engine 110 and the dashboard 128, including the feature to manage employees 140, the loyalty section 136, the feature to manage customer loyalty 152 (as depicted in FIG. 3B), the feature to manage the customers 142, the feature to manage the services 146, the section listing the sales for a given day 148, the section listing daily payouts 150, and the section listing lifetime sales 152, which will not be accessible to the user 102 associated with the employee access level 107.

For example, the user 102 associated with the administrator access level 105 (e.g., the administrator) may engage with the feature to manage customer loyalty 152 of the dashboard 128. The administrator may modify a length of the predetermined time period 126 (e.g., the time frame component 156). For example, the administrator may notice that the current sales for the business 186 are low and may wish to increase the predetermined time period 126 from one week to one month in order to attract or incentivize more customers to visit the business 186. In another example, the administrator may notice that the current sales for the business 186 are quite high and may wish to decrease the predetermined time period 126 from one month to one week in order to retain profit. The modified length of the predetermined time period 126 may be displayed via the dashboard 128 and may be conveyed to the user 102 associated with the customer access level 103.

In another example, the administrator may modify an amount of the first discount 120 and/or the second discount 122 (of the discount component 158) associated with the service 116. As an illustrative example, the service B 164 is the eyebrow wax, the time frame 156 associated with the service B 164 is the second time frame 170 defined as 90 days, and the status 160 of the discounts are in the active status 180. The administrator may wish to increase the amount of the first discount 120 (associated with the first purchase by the user 102 of the service B 164 during the 90 days) from 10% to 15% and/or the second discount 122 (associated with the second purchase by the user 102 of the service B 164 during the 90 days) from 20% to 25% to sell a higher quantity of the service B 164 during the second time frame 170 defined as 90 days.

In a further example, the service A 162 is the pedicure, the time frame 156 associated with the service A 162 is the first time frame 168 defined as 60 days, and the status 160 of the discounts are in the active status 180. The administrator may notice that the sales of the service A 162 are high during the first time frame 168 and may wish to decrease the amount of one or more of the first discount 120 from 10% to 5% and the second discount 122 from 20% to 15%.

The modified length of the predetermined time period 126 (e.g., of the time frame component 156) and/or the modified amount of the first discount 120 and/or the second discount 122 (e.g., of the discount component 158) may be displayed via the dashboard 128 and may be conveyed to the user 102 associated with the customer access level 103.

FIG. 4 is a block diagram of a computing device included within the computer system of FIG. 1 that is configured to calculate discounts for a user based on a quantity of visits to a service business during a predetermined time period, in accordance with embodiments of the present invention.

In some embodiments, the present invention may be a computer system, a method, and/or the computing device 104 (of FIG. 1) or the computing device 400 (of FIG. 4). For example, the computer system and/or the computing device 400 may be utilized to implement a method for calculating the discounts (e.g., the first discount 120 and/or the second discount 122) for the user 102 based on a quantity of visits to a service business (e.g., the business 186) during the predetermined time period 126.

A basic configuration 402 of a computing device 400 is illustrated in FIG. 4 by those components within the inner dashed line. In the basic configuration 402 of the computing device 400, the computing device 400 includes a processor 404 and a system memory 406. In some examples, the computing device 400 may include one or more processors and the system memory 406. A memory bus 408 is used for communicating between the one or more processors 404 and the system memory 406.

Depending on the desired configuration, the processor 404 may be of any type, including, but not limited to, a microprocessor (μP), a microcontroller (μC), and a digital signal processor (DSP), or any combination thereof. Further, the processor 404 may include one more levels of caching, such as a level cache memory 412, a processor core 414, and registers 416, among other examples. The processor core 414 may include an arithmetic logic unit (ALU), a floating point unit (FPU), and/or a digital signal processing core (DSP Core), or any combination thereof. A memory controller 418 may be used with the processor 404, or, in some implementations, the memory controller 418 may be an internal part of the memory controller 404.

Depending on the desired configuration, the system memory 406 may be of any type, including, but not limited to, volatile memory (such as RAM), and/or non-volatile memory (such as ROM, flash memory, etc.), or any combination thereof. The system memory 406 includes an operating system 420, one or more engines, such as a loyalty engine 423, and program data 424. In some embodiments, the loyalty engine 423 may be a loyalty application, a loyalty software program, a loyalty service, or a loyalty software platform, as described infra. Moreover, in additional examples, the loyalty engine 423 may comprise the algorithm 112, such as an artificial intelligence (AI) algorithm or an AI computer vision algorithm, among other algorithms not explicitly listed herein.

The loyalty engine 423 may receive, from the user 102, login credentials 114. The loyalty engine 423 may identify the user 102 and an access level granted to the user 102 from the login credentials 114. The access level granted to the user 102 is a customer access level 103. Then, the loyalty engine 423 may receive a request from the user 102 associated with the customer access level 103 for a service 116 to be performed at the business 186 during the first time period 118. The loyalty engine 423 may determine that the first time period 118 is within the predetermined time period 126. In response to this determination, the loyalty engine 423 may identify the quantity of visits 124 of the user 102 associated with the customer access level 103 to the business 186 during the predetermined time period 126.

The loyalty engine 423 may also generate the first discount 120 based on a first quantity of visits of the user 102 associated with the customer access level 103 to the business 186 during the predetermined time period 126 and may generate the second discount 122 based on a second quantity of visits of the user 102 associated with the customer access level 103 to the business 186 during the predetermined time period 126. The first quantity of visits is greater than the second quantity of visits. Further, the first discount 120 is greater than the second discount 122. The loyalty engine 423 may then display the first discount 120 or the second discount 122 to the user 102 associated with the customer access level 103. Further, the computing device 400 may comprise a storage engine 426, which may be configured to store information used or accessed by the loyalty engine 110 (of FIG. 1) or the loyalty engine 423 (of FIG. 4).

Moreover, the computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the one or more removable storage devices 436 and the one or more non-removable storage devices 438 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which are configured to communicate to various external devices, such as a display or speakers, via one or more A/V ports 452. The one or more peripheral interfaces 444 may include a serial interface controller 454 or a parallel interface controller 456, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 458. Further, the one or more communication devices 466 may include a network controller 460, which is arranged to facilitate communication with one or more other computing devices 462 over a network communication link via one or more communication ports 464. The one or more other computing devices 462 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 406, the one or more removable storage devices 436, and the one or more non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps of calculating discounts for a first user based on a quantity of visits to a business during a predetermined time period. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by a loyalty engine on a computing device for calculating discounts for a first user based on a quantity of visits to a business during a predetermined time period, the computing device comprises a processor and a memory, the method comprising:
   displaying, by the loyalty engine upon execution by the processor, on a display attached to the computing device, a first interface of a dashboard, wherein the first interface comprises:
      a plurality of services;
      a time frame associated with each of the plurality of services;
      at least a first discount and a second discount associated with each of the plurality of services; and
      a status with each of the plurality of services, wherein the status is either active or non-active,
      wherein the plurality of services, the time frame, the at least first discount and second discount, and the status are organized in a tabular configuration;
   receiving, through a graphical user interface, login credentials from the first user;
   identifying the first user and an access level granted to the first user based on the login credentials, wherein the access level granted to the first user is a customer access level;
   receiving, through the graphical user interface, a request from the first user for a service from the plurality of services to be performed at the business during a first time period; and
   in response to a determination that the first time period is within a predetermined time period,
      identifying the quantity of visits of the first user to the business during the predetermined time period;
      generating the first discount based on a first quantity of visits of the first user to the business during the predetermined time period;
      generating the second discount based on a second quantity of visits of the first user to the business during the predetermined time period, wherein the first quantity of visits is greater than the second quantity of visits, and wherein the first discount is greater than the second discount; and
      displaying, through the graphical user interface, the first discount or the second discount to the first user.

2. The method of claim 1, wherein the first discount and the second discount are incremental discounts.

3. The method of claim 1, further comprising:
   requesting, through a payment requesting feature of the dashboard, a payment for the service; and
   receiving a payment from the first user.

4. The method of claim 1, further comprising:
   receiving login credentials from a second user;
   identifying the second user and the access level granted to the second user based on the login credentials of the second user, wherein the access level granted to the second user is an administrator access level;
   receiving, through a second interface of the dashboard, a modification in a time frame for one or more services of the plurality of services; and
   modifying the respective time frame.

5. The method of claim 4, further comprising:
   receiving, through the second interface, a modification from the second user to the first discount and/or the second discount for the one or more services of the plurality of services; and
   modifying the respective first discount and/or the second discount.

6. The method of claim 5, wherein the first discount and/or the second discount are determined based on one or more factors selected from a group consisting of a popularity of a service during the predetermined time period, a profitability of the business during the predetermined time period, a quantity of customers visiting the business during the predetermined time period, a geographic location of the business, a month of the year, and a time during a day during which the service is availed.

7. The method of claim 4, further comprising:
   receiving login credentials from a third user;
   identifying the third user and the access level granted to the third user based on the login credentials of the third user, wherein the access level granted to the third user is an employee access level;
   receiving a notification from the third user that the service is completed;
   requesting, through a payment requesting feature of the dashboard, a payment for the service; and
   receiving a payment from the first user.

8. The method of claim 1, further comprising:
   in response to a determination that the first time period is outside of the predetermined time period, displaying a non-discounted cost associated with the service.

9. A computer system comprising one or more processors, one or more memories, and one or more computer-readable hardware storage devices, the one or more computer-readable hardware storage devices containing program code executable by the one or more processors via the one or more memories to implement a method for calculating discounts for a first user based on a quantity of visits to a service business during a predetermined time period, the method comprising:
- displaying on a display attached to the computer system, a first interface of a dashboard, wherein the first interface comprises:
  - a plurality of services;
  - a time frame associated with each of the plurality of services;
  - at least a first discount and a second discount associated with each of the plurality of services; and
  - a status with each of the plurality of services, wherein the status is either active or non-active,
  - wherein the plurality of services, the time frame, the at least first discount and second discount, and the status are organized in a tabular configuration;
- receiving, through a graphical user interface, login credentials from the first user;
- identifying the first user and an access level granted to the first user based on the login credentials, wherein the access level granted to the first user is a customer access level;
- receiving, through the graphical user interface, a request from the first user for a service from the plurality of services to be performed at the service business during a first time period; and
- in response to a determination that the first time period is within a predetermined time period,
  - identifying the quantity of visits of the first user to the service business during the predetermined time period;
  - generating the first discount based on a first quantity of visits of the first user to the service business during predetermined time period;
  - generating the second discount based on a second quantity of visits of the first user to the service business during the predetermined time period, wherein the first quantity of visits is greater than the second quantity of visits, wherein the first discount is greater than the second discount, and wherein first discount and the second discount are incremental discounts; and
- displaying, through the graphical user interface, the first discount or the second discount to the first user.

10. The computer system of claim 9, wherein the method further comprises:
- receiving login credentials from a second user;
- identifying the second user and the access level granted to the second user based on the login credentials of the second user, wherein the access level granted to the second user is an employee access level;
- receiving a notification from the second user that the service is completed;
- requesting, through a payment requesting feature of the dashboard, a payment for the service; and
- receiving a payment from the first user.

11. The computer system of claim 10, wherein the method further comprises:
- receiving the login credentials from a third user;
- identifying the third user and the access level granted to the third user based on the login credentials of the third user, wherein the access level granted to the third user is an administrator access level;
- receiving a modification in a time frame for one or more services of the plurality of services; and
- modifying the respective time frame.

12. The computer system of claim 11, wherein the method further comprises:
- receiving a modification from the third user to the first discount and/or the second discount for the one or more services of the plurality of services; and
- modifying the respective first discount and/or the second discount.

* * * * *